United States Patent [19]

Savage et al.

[11] 4,283,278
[45] Aug. 11, 1981

[54] SCREENS

[75] Inventors: Norman Savage, Oldham; Douglas A. Sumner, Newton-le-Willows, both of England

[73] Assignee: N. Greening Limited, England

[21] Appl. No.: 22,752

[22] Filed: Mar. 22, 1979

[30] Foreign Application Priority Data

Mar. 23, 1978 [GB] United Kingdom ............... 11558/78

[51] Int. Cl.³ .................................................. B07B 1/46
[52] U.S. Cl. .................................. 209/395; 209/405; 210/498
[58] Field of Search ............... 209/392, 393, 395, 405, 209/408, 400; 210/498, DIG. 3; 52/697, 699

[56] References Cited

U.S. PATENT DOCUMENTS

| 444,252 | 1/1891 | Palm | 209/395 |
|---|---|---|---|
| 647,399 | 4/1900 | Geske | 209/395 |
| 1,275,713 | 8/1918 | McKee | 209/395 |
| 1,942,948 | 1/1934 | Booth | 209/393 |
| 2,003,923 | 6/1935 | Clausen | 209/405 |
| 2,690,265 | 9/1954 | Bixby | 209/395 X |
| 3,042,206 | 7/1962 | Olender | 209/395 |
| 3,308,090 | 4/1964 | Morawski | 209/395 X |
| 3,494,461 | 2/1970 | Fournier | 209/395 |
| 3,901,801 | 8/1975 | Bixby | 209/395 |
| 3,905,897 | 9/1975 | Jacobson | 209/405 |
| 4,152,256 | 5/1979 | Wennberg | 209/395 |

FOREIGN PATENT DOCUMENTS

| 243214 | 11/1925 | United Kingdom | 209/395 |
|---|---|---|---|
| 691617 | 5/1953 | United Kingdom | 209/393 |

*Primary Examiner*—Robert Helper
*Attorney, Agent, or Firm*—William A. Drucker

[57] ABSTRACT

In apertured panels comprising a plurality of wires (10) having loops (12) at intervals along their lengths and spaced so as to define slit apertures (13) between adjacent wires, the wires being connected together as a panel by tie rods, tubes or the like (11) extending through aligned loops thereof, loop parts of at least some of the wires are secured to a rib member or members extending transversely thereof. The rib member(s) may cooperate seatingly with the loops over at least part of the length of the rib member(s). The rib is preferably a hollow member, for example an inverted V-section channel. Such an arrangement is intended to overcome problems of aligning the rib to the loop in manufacture and also of distortion, specifically bowing, of the rib or/and underlying tie rod.

19 Claims, 10 Drawing Figures

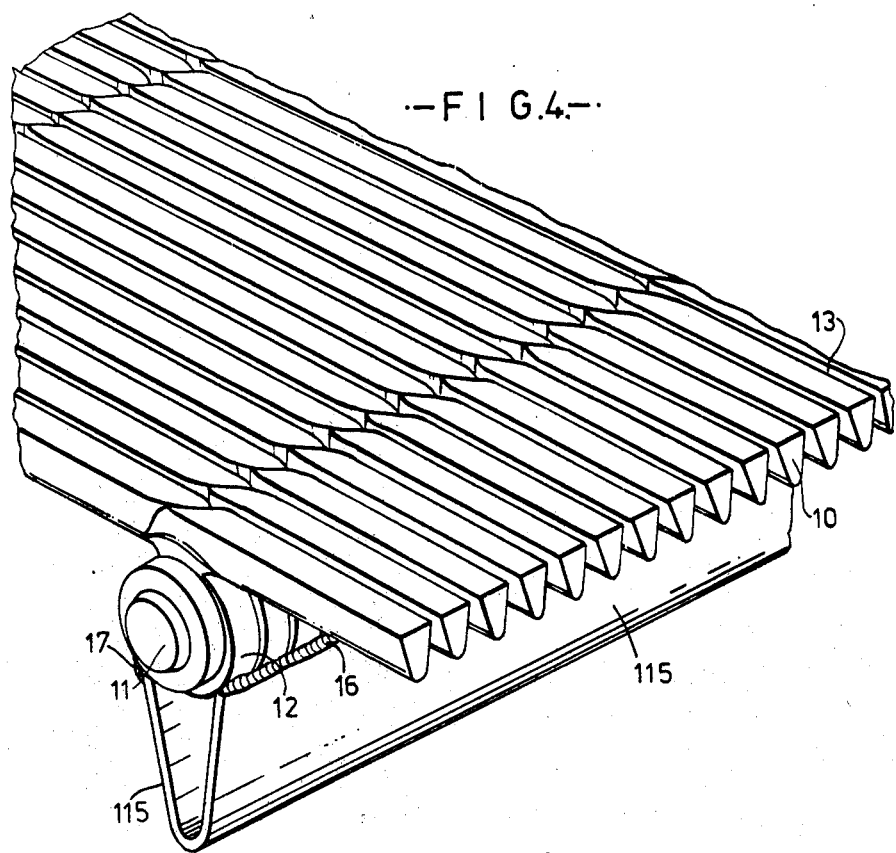
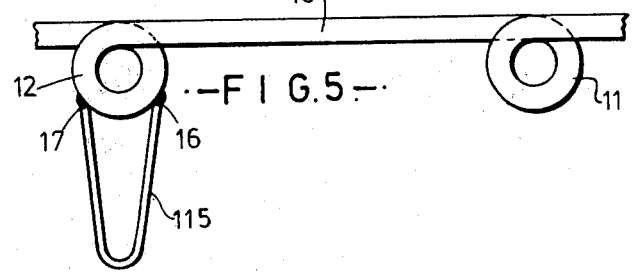

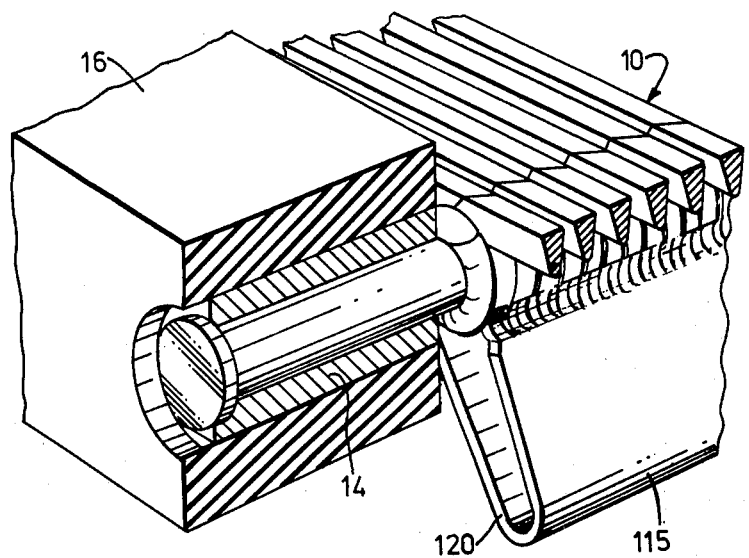
—FIG.7.—
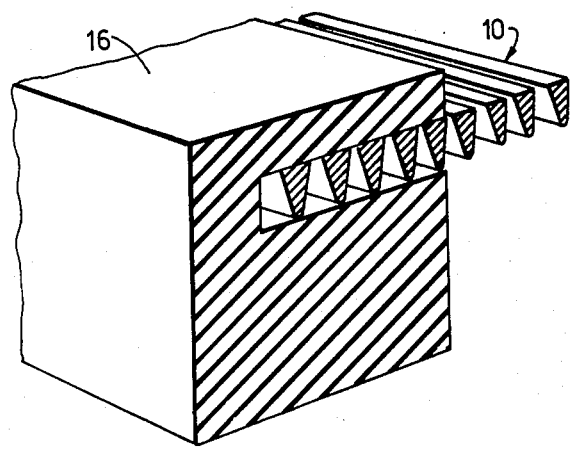
—FIG.8.—

SCREENS

The invention relates to screens such as are used for screening materials for example by sizing or de-liquefying and is particularly applicable to screen panels of the kind formed by a plurality of looped wires secured side-by-side to define the apertures.

It is known to provide such a screen panel by forming loops in individual lengths of wire and then threading them onto tie rods extending through the loops. Deformation of each loop to a predetermined small misalignment of inter-loop parts produces a "joggle" at each loop and sets the widths of slits or apertures between adjacent wires. The width of such slits can be accurately determined by pressing the sides of the loop together, before or after assembly onto the tie rods. Often, such a screen panel will have ferrules rivetted onto free end of the rods. A suitable seating strip e.g. of metal, rubber or the like attached to the ends of the tie rods, with or without ferrules, may be preferred in fitting the panel to be vibrated in a conventional screening machine.

Although such panels afford very accurate initial aperture sizing, problems arise because adjacent wires may be subject to relative movement and wear due at least partly to flexing of the screen when it is vibrated in use. The flexing is higher if the unsupported span of the screen is large unless steps are taken to adjust its resistance to flexing. In this respect it should be noted that it is known to increase the screen stiffness by using larger cross-sections of or reduced spacings between the tie rods. Such measures are often unsatisfactory because of the consequent increase in vibratory mass due to the extra weight of the tie rods and its negating effect on intended improvement.

An object of the present invention is to provide an apertured panel of the kind referred to and in which the above mentioned problems are mitigated or eliminated.

According to one aspect of the present invention an apertured panel comprises a plurality of wire members looped at intervals along their lengths and spaced, preferably by the configuration of their loop portions, so as to define slit-like apertures between adjacent wires, the wires being connected together to form a panel by rods, or tubes if preferred, extending through their aligned loops, with loop parts of at least some of the wires being secured to a rib member or members extending transversely thereof. The rib member or members may be solid and lie parallel to the tie rod. Although a rectangular section is preferred an inverted T-section might be employed or other suitable sections.

It has been found however, especially in the case of wide screens which require long ribs, that accurate alignment of the rib with the loops may present problems during manufacture. In addition, lateral distortion can occur after welding leading to bowing of the rib and underlying tie rod. Although it is usually possible to correct the bowing, or prevent it by maintaining suitable clamping until after cooling, such correction or prevention may lead to undesirable stresses in, and weakening of, the screen components, reducing its life expectancy.

In view of this problem, according to a second aspect of the invention there is provided an apertured panel of the afore-mentioned kind in which the rib member or members cooperate seatingly with the loops over at least part of the length of the rib member.

Preferably the seating is such that the loops, and any tie rods extending therethrough, are positively located by the rib member against movement laterally of the longitudinal axis of the rib member. This is achieved where the or each rib member is arranged, e.g. by being hollow or recessed, to straddle the loops, over at least part of its length and is secured thereto at opposite sides of the axis of the tie rod or loops.

In a preferred embodiment the rib is hollow, conveniently comprising an inverted channel, for example of substantially "V" section, its edges secured to the loops. The member may be secured to the loops along the entire length of both edges or, if preferred, alternate loops, or groups of loops, could be secured to different edges of the member.

Whether the rib member cooperates seatingly with the loops, or not, for wedge-section wire, upper parts of the adjacent loops are preferably in contact one with another.

Reinforcingly interconnecting the bottoms of the loops has the effect of limiting any relative movement of the loops so reducing chaffing and also increasing the resistance to flexing, forming as it were the lower span of a beam. Any increase in weight due to the addition of the rib yields a much greater increase in resistance to flexing than the equivalent weight increase involved in merely increasing the size or number of tie rods.

Furthermore, the depth and/or section of the rib can be selected according to particular applications and desired unsupported spans.

According to a further aspect of the invention a method of making an apertured panel of the other aspects comprises assembling a plurality of wires having loops at intervals along their lengths onto tie rods, tubes or the like extending through aligned loops such that the parts of the wires between the loops are spaced to define desired slit apertures, aligning a rib member with the loops and securing mating portions of the rib member and loops together by application of mutual pressure and/or heat.

In preferred embodiments the rib is welded to the loops. Solid ribs may conveniently be electrically pressure welded. However, it has been found that satisfactory results can be achieved where, due to the combination of heat and pressure, the material of the rib and loops is merely compounded or forged, usually with complementary deformation of mating parts thereof.

The rib need not extend across the whole width of the screen or panel, but it is envisaged that in some embodiments the rib will extend at least to the end of the screen and be secured, perhaps welded, to the projecting end of the tie rod and/or to any sleeve or ferrule located thereupon. Where the rib is to be secured directly to the rod, it may be bent or stepped as required, any rubber or other seating strip being correspondingly recessed as required to accommodate the rib or/and rod end.

It is further envisaged that the rib may be stopped short of the end of the panel say where it is required for the rubber support strip to overlap the edge of the panel.

Embodiments of the invention will now be described by way of example only and with reference to the accompanying drawings in which:

FIG. 4 is similar view to FIG. 1 but of a screen having a hollow rib member,

FIG. 5 is a side view of the screen portion of FIG. 4, and

FIGS. 6 to 10 illustrate edge attachment adaptations for the different embodiments of the invention.

In the drawings corresponding parts in different Figures are identified by the same reference numeral.

Figure 1:
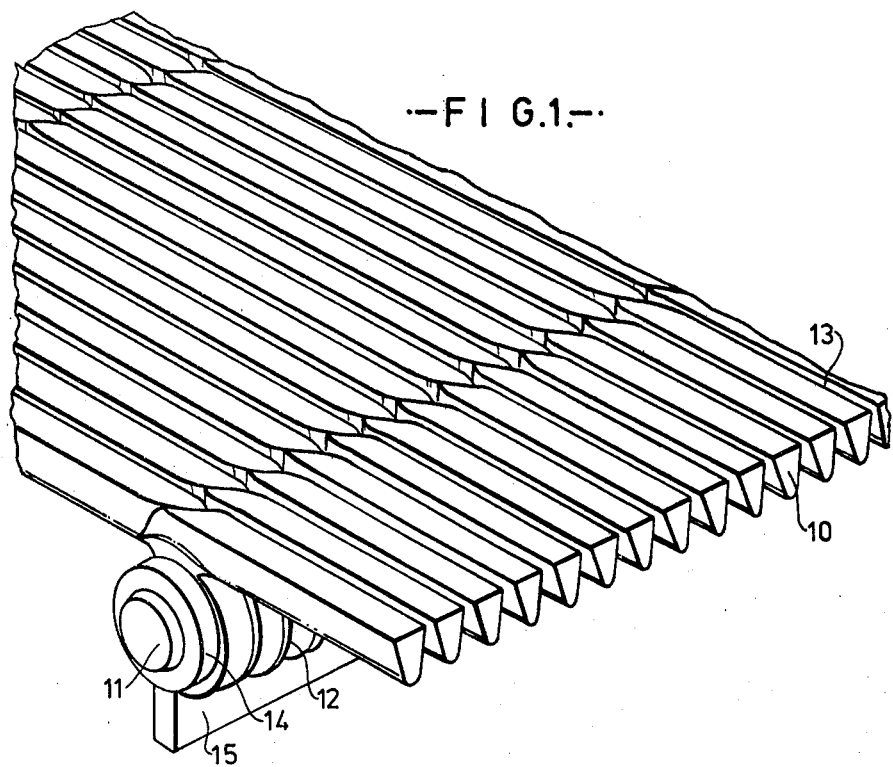
FIG. 1 is a perspective view of a screen formed from a plurality of looped wires.
Figure 2:
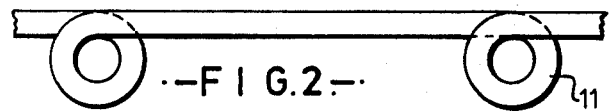
FIG. 2 is a side view of the looped wire.
Figure 3:
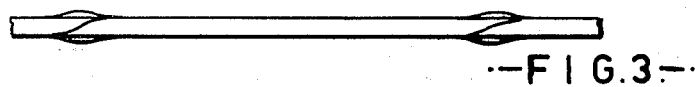
FIG. 3 is a plan view corresponding to FIG. 2.

FIG. 1 shows a portion of screen comprising a plurality of looped wedge-section wires 10, secured together side-by-side by tie bars 11 extending through depending loops 12 of the individual wires. Apertures or slits 13 are provided between the adjacent wieres due to predetermined small misalignment of inter-loop parts giving spacing of the remainder of the wire when the loops are in contact. The width of the slits 13 is accurately determined by deformation of the loops producing a "joggle" at each loop. FIGS. 2 and 3 illustrate suitably deformed wires.

When a required number of wires 10 have been assembled for a desired screen size, a ferrule or sleeve 14 is secured upon the end of the tie bar, e.g. by rivetting or peening over the end of the tie bar, so as to clamp the wires together.

A rib 15, shown in FIG. 1 as being of rectangular section, is then placed along the lowermost edges of the loops, extending parallel to the tie bar and is secured to the loops, typically but not necessarily by welding. It has been found that a satisfactory joint between the rib and loops is achieved using an electrical/resistance heating technique with simultaneous application of mutual pressure to the loops and rib. Although it is preferable to weld the rib to the loops in this way it is possible that a satisfactory bond will be achieved with the parts being merely forged or compounded.

In order to reduce the possibility of distortion of the screen and misalignment of the rib relative to the loops, it is convenient to lay the screen with its usually uppermost surface lying on a plate electrode of the electrical/resistance heating apparatus, align the rib above the loops using a suitable jig, and then apply pressure and the required electrical current to the rib by means of a strip-like second electrode of the machine.

It is envisaged however that improved resistance to flexing of the screen and/or relative displacement of the wires would be achieved by securing, say welding or forging the interior portions of the loops to the tie bar in addition to securing their outer portions to the rib. This might conveniently be achieved by using the tie bar as the first electrode instead of the plate on which the screen is laid.

FIG. 5 shows an alternative embodiment of the invention similar to that shown in FIG. 1 but differing in that the rib member 115 is a channel of inverted "V" sections which extends along the lowermost edges of the loops 12, parallel to the tie rod, and is welded to the loops along the entire length of both its extreme edges 116 and 117. Although it is preferable to weld the rib to the loops in this way it is possible that a satisfactory bond will be achieved with the parts being merely forged or compounded.

To assemble the screen it is convenient to lay the screen with its usually uppermost surface lying on a plate, seat the rib above the loops, apply pressure and weld along the edges of the rib.

It will be appreciated that the edges of the channel member will seat against opposite sides of the loops. Thus, with suitable pressure applied to the rib, to force it onto the loops during the welding or other securing operation, the possibility of lateral distortion of the loops and tie rod, before and after welding, and therewith of the screen as a whole, is reduced.

Although a hollow rib as described hereinbefore, of "V" or other section, is advantageous in providing seating contact and positive location of the loops whilst requiring less material for a particular resistance to flexing than an equivalent solid bar, which is of advantage where the screen is to be vibrated, in some applications a solid rib may be preferred in which case seating contact between the rib and the loops may be obtained by longitudinally recessing that edge of the rib which is to seat upon the loops. The recess may even be arranged to conform to the profile of the loops.

It is envisaged that, for onerous conditions, say where large unsupported spans are required, both edges of the rib will be secured to all the loops e.g. by a continuous weld along both edges as previously described. However, it should be noted that the invention comprehends a screen in which alternate loops, or alternate groups of loops, are secured to a different edge of the rib e.g. by a succession of welds at opposite sides alternately of the rib.

It is also envisaged that satisfactory seating and positive location might be obtained where the rib member has adjacent portions displaced alternately to opposite sides of the axis of the loops. Each loop of said corresponding alternate loops or groups of loops would then be secured to the one rib portion only.

It will be appreciated that the rib need not be provided at every tie bar/loop location and also that it need not extend across the entire width of the screen. In particular, where the rubber support strip must overlap the edge of the screening surface the rib will usually end short of the edge of the screen. Alternatively, the rubber support strip might be recessed to accommodate the rib in addition to any tie rod extension and/or ferrule.

The increased spans permissible with embodiments of the invention may lead to increased loading at the edges of the screen where it is attached to the screening machine. Suitable attachment arrangements for such loading are illustrated in FIGS. 6 to 12. It will be appreciated that with suitable modification these attachment arrangements could be applied to solid or hollow ribs.

Figure 6:
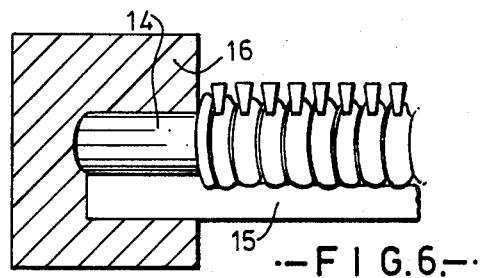

In FIG. 6 the rib 15 not only extends beyond the edge of the screen, but is joined, e.g. welded or forged, as at 18, to the ferrule 14 for extra strength, the rubber support or seating strip 19 being suitably recessed. In this case the ends of the rib edges are stepped to allow for the difference in diameter of the loops and ferrule.

Such stepping could of course permit the rib to be secured directly to the tie rod so dispensing with the ferrule.

In the arrangement shown in FIG. 7 the rib member 115 terminates at the edge of the screening surface. Its end 120 adjacent the rubber seating strip 16 is inclined downwardly away from the seating strip which is of reduced depth as it need accommodate only the ferrule or sleeve 14.

Figure 9:
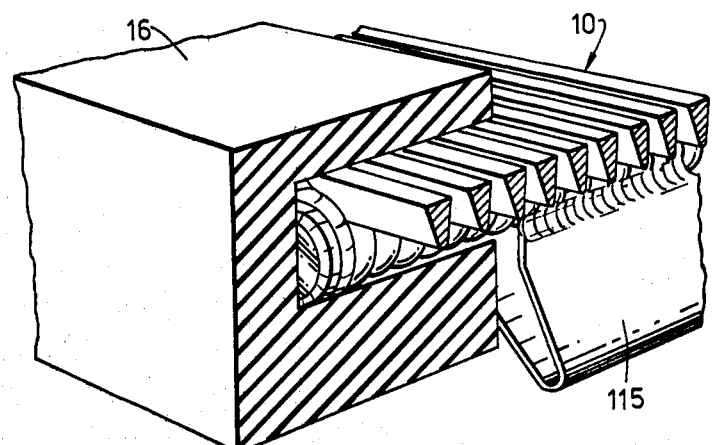
Figure 10:
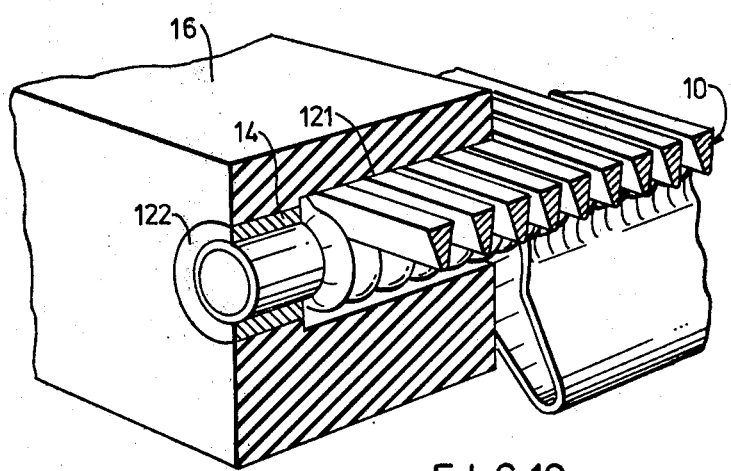

FIG. 8 is a section perspective view taken intermediate the tie rods of an arrangement in which the seating strip 16 is recessed to closely accommodate several of the wedge wires 10. At the tie rod positions the recess is adapted also to accommodate the looped portions of those wires as shown in FIG. 9. It will be noted from FIG. 9 that the sleeve 14 has been omitted. However where required, or desired, a sleeve 14 might be provided, as illustrated in FIG. 10, where the endmost wires 10 are accommodated in a suitable recess 121 and the ferrule 14 in a hole 122 extending from the recess to the outermost edge of the strip 16.

The rib may be secured to any intermediate reinforcement strip, often provided parallel to the strips and located on the tie rods, and the ribs may serve directly as, or carry, a superstructure e.g. for a rapping device.

Advantages of a rib secured to the loops as hereinbefore described are that, firstly, the loops are secured firmly together at a position remote from the upper screen surface, so giving a beam-like construction with consequent improved bending moment, permitting greater unsupported spans which can be improved still further by increasing the depth of the rib or varying its cross-section to give a greater cross-sectional area at a position as far below the screen surface as possible with little or least addition of rib weight e.g. an inverted T or bottom bead, whether the rib is hollow or not. If the loops were merely welded together say with a weld run across their lower portions, when the plate was flattened again the welds could be weakened and may be liable to fracture in service. The ribs, on the other hand, will reduce any tendency to weld fracture.

An additional advantage of a hollow rib member is that it will have a greater resistance to flexing, particularly laterally, than a solid bar of similar depth and mass per unit length.

We claim:

1. An apertured panel comprising a screen constituted by, in combination:
   (i) a plurality of wire members each having a plurality of loops formed therein with the individual loops being disposed at intervals along the length of the wire member, the wire members being disposed side by side and at a spacing so as collectively to present a major face of the screen having slit apertures defined between adjacent wires, the loops extending from the opposite major face of the screen,
   (ii) at least one tie element positioned through aligned respective loops disposed side by side of wire members of the plurality of wire members, and tied to said plurality of wire members, and
   (iii) at least one rib member secured to said aligned loops by at least one weld and extending therefrom in a direction away from said opposite major face.

2. An apertured panel, as claimed in claim 1, wherein said at least one rib member is of rectangular section in said direction away from said opposite major face.

3. An apertured panel, as claimed in claim 1, wherein said at least one rib member cooperates seatingly over at least part of its length with loop parts of at least some of said wires.

4. An apertured panel, as claimed in claim 1, wherein said at least one rib member straddles the loops and is secured to loops at opposite sides of a common central axis of the aligned loops.

5. An apertured panel, as claimed in claim 4, wherein each loop is secured to the rib member at both said opposite sides.

6. An apertured panel, as claimed in claim 4, wherein alternate loops are secured to different edge portions of the rib member.

7. An apertured panel, as claimed in claim 4, wherein alternate groups of loops are secured to different edge portions of the rib member.

8. An apertured panel, as claimed in claim 1, wherein the at least one rib member extends at least to a lateral edge of the panel.

9. An apertured panel, as claimed in claim 1, wherein an end portion of a rib member extends beyond a lateral edge of the panel and is secured to an end portion of the tie element positioned through those loops to which the rib is secured.

10. An apertured panel, as claimed in claim 9, wherein the rib member end portion is secured directly to the tie element end portion.

11. An apertured panel, as claiemd in claim 9, wherein the rib member end portion is secured to a ferrule, and the ferrule is secured to the tie element end portion.

12. An apertured panel, as claimed in claim 1, wherein said at least one rib member is hollow.

13. An apertured panel, as claimed in claim 12, wherein said at least one rib member comprises a channel member secured to the loops at its edge portions.

14. An apertured panel, as claimed in claim 13, wherein said at least one rib member is of generally V-shaped cross-section.

15. An apertured panel, as claimed in claim 1, wherein the rib member does not extend to a lateral edge of the panel.

16. An apertured panel, as claimed in claim 1, wherein loops of at least some of the wires are secured to said tie element.

17. An apertured panel, as claimed in claim 16, wherein said loops are secured to said tie element by welding.

18. An apertured panel as claimed in claim 1 wherein said at least one rib member is of rectangular section in depth, in said direction away from said opposite major face, substantially greater than width normal to said direction.

19. An apertured panel as claimed in claim 1 wherein said at least one rib member extends at least to a lateral edge of the panel.

* * * * *

UNITED STATES PATENT AND TRADEMARK OFFICE
CERTIFICATE OF CORRECTION

PATENT NO. : 4,283,278
DATED : August 11, 1981
INVENTOR(S) : Norman Savage et al.

It is certified that error appears in the above-identified patent and that said Letters Patent are hereby corrected as shown below:

(30) Foreign Application Priority Data

March 23, 1978     United Kingdom........11558/78
February 3, 1979    United Kingdom....... 03854/79

Signed and Sealed this

Ninth Day of February 1982

[SEAL]

Attest:

GERALD J. MOSSINGHOFF

Attesting Officer     Commissioner of Patents and Trademarks